Sept. 7, 1926. 1,598,868
O. F. LUNDELIUS
HOOD OR RADIATOR MOUNTING
Filed Dec. 3, 1923
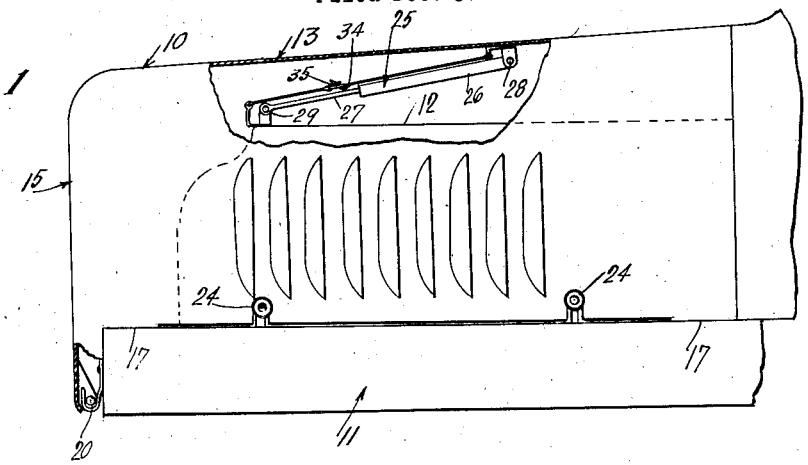
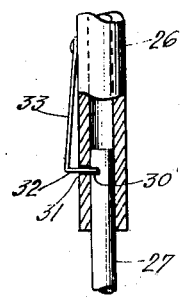
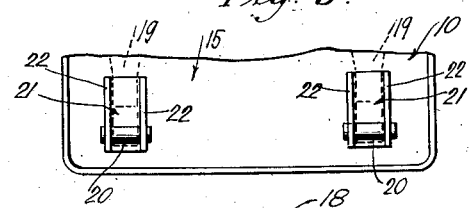
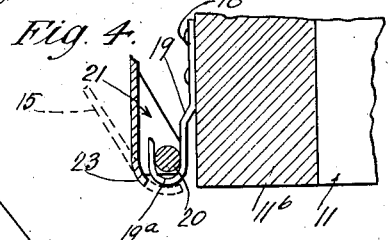
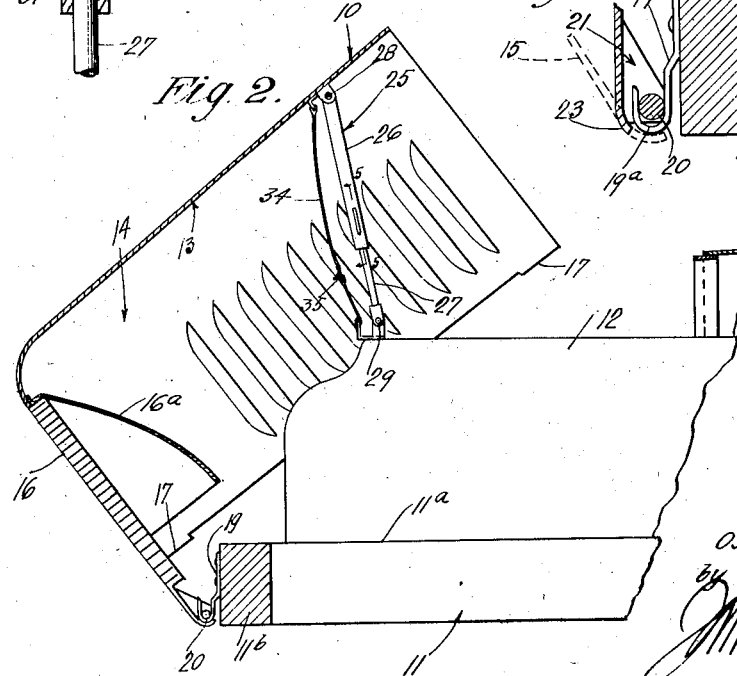
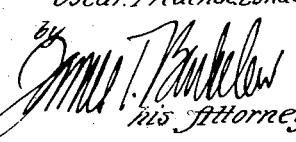

Patented Sept. 7, 1926.

1,598,868

UNITED STATES PATENT OFFICE.

OSCAR FREDERICK LUNDELIUS, OF LOS ANGELES, CALIFORNIA, ASSIGNOR, BY DIRECT AND MESNE ASSIGNMENTS, TO LUNDELIUS & ECCLESTON MOTORS CORPORATION, OF LAS VEGAS, NEVADA, A CORPORATION OF DELAWARE.

HOOD OR RADIATOR MOUNTING.

Application filed December 3, 1923. Serial No. 678,155.

This invention relates to mountings for hoods and radiators used in connection with motor vehicles, and more particularly has to do with mountings for hoods which are adapted to be tilted forwardly when it is desired to expose the vehicle engine for inspection or repair.

Due to the fact that the forward wall of such a hood is integral with the hood body and therefore moves with respect to the vehicle frame when the hood is tilted, the invention may be applied with particular advantage to vehicles equipped with engines of the air cooled type, since vehicles so equipped have no radiators to interfere with such hood movement. Therefore I will describe my invention as applied to a vehicle having an air cooled engine, but this is not to be construed as a limitation on the invention, for, by the use of proper hose connections between radiators, pumps and cylinder water jackets, the mounting of radiators for water cooled engines may be similar to that of the hood. While, for convenience and brevity, I will refer, throughout the following specification and claims, to the hood as the mounted member, it will be understood that such references are intended to include engine radiators as mounted members.

So that it may be forwardly tiltable, there is a pivotal connection between the forward edge of the hood and the vehicle frame, and it is desirable that as little strain as possible be imposed upon such connection. Therefore I have devised a novel hood mounting whereby, when the hood is in lowered position, the side walls of the hood are adapted to bear on the vehicle frame in a manner to relieve the pivotal connection of stresses and strains. To obtain this result, I utilize hook hangers on the forward end of the vehicle frame, which hangers serve as bearings for trunnions carried by the forwardly disposed wall of the hood, but when the hood is in lowered position (which position it occupies most of the time) the trunnions are lifted out of bearing relation with the hangers, although the trunnions and hangers coact at all times in a manner to limit relative longitudinal and transverse movement between the vehicle frame and the forward end of the hood.

I have also provided means for preventing the trunnion from becoming accidentally dislodged from the hangers while the hood is tilted out of its lowered position. However, should it be desired to remove the hood bodily from the vehicle frame, said hood may be lifted vertically from its lowered position, without interference between hangers and trunnions.

In order that the hood may be held at a predetermined angle of tilt when it is desired to have access to the engine therebeneath, I have provided releasable holding means in the form of two associated members capable of relative longitudinal slidable movement, one member being pivoted to the hood and the other to a frame supported member, there being a spring detent adapted to hold the associated member against further relative movement when the hood has reached the predetermined angle of tilt.

Further objects and features of novelty of the invention will be set forth in the following detailed description, reference being had to the accompanying drawings, in which:—

Figure 1 is a fragmentary longitudinal section through a vehicle equipped with my hood, certain elements being shown in elevation, and the hood being partially broken away to expose the pivotal hood mounting and the releasable holding means.

Fig. 2 is a longitudinal sectional view through the hood, showing it in tilted position on the vehicle frame.

Fig. 3 is a fragmentary view of the forward wall of the hood as viewed from within the hood, and showing the hood trunnions.

Fig. 4 is an enlarged detail view of the pivotal connection between hood and vehicle frame; and Fig. 5 is an enlarged section on line 5—5 of Figure 2.

I have shown the hood 10 as being mounted on a vehicle frame generally indicated at 11, the power plant (not shown) for the vehicle being mounted on the frame and enclosed within housing 12.

For the purpose of more definitely locating certain elements, I will designate the several hood walls by individual numerals. Thus the top wall of the hood is designated at 13, the side walls at 14, and the forward wall at 15. Wall 15 is suitably apertured at 16 to admit air to the cooling system of the housed engine, a director 16ª being secured to wall 15 in a manner to direct the flow of air from said apertures to said cooling system.

The lower edges of side walls 14 are centrally relieved (see Figure 2) whereby, when the hood is in the lowered position of Figure 1, only portions 17 of said edges bear on top the side rails 11ª of vehicle frame 11.

At this point, I wish to mention the fact that in the case of a vehicle equipped with a water cooled motor, the radiator therefor would be in a position corresponding to that of forward wall 15, and portions of the lower side edges of the radiator would bear on the vehicle frame in the same manner as do the forward wall portions 17, in the illustrated embodiment.

Secured at 18 to the cross rail 11ᵇ of frame 11, are laterally spaced hangers 19. These hangers are of hook formation, their mouths being disposed upwardly to allow the insertion from above or trunnions 20 which are carried by brackets 21 on the inner face of wall 15. Brackets 21 include arms 22, which are laterally spaced apart so they extend on each side of their associated hangers, whereby relative transverse movement between the vehicle frame and the forward end of the hood is limited. The hook hangers also embrace the trunnions in a manner to prevent the hood from shifting longitudinally along the vehicle frame.

The vertical distance between the top of frame 11 and the bearing faces 19ª of hangers 19 is greater than the perpendicular distance between bearing faces 17 of the hood and the bearing faces of the trunnions. Therefore, when the hood is in the lowered position of Figure 1, trunnions 20 are held out of bearing engagement with hangers 19 so no strain is imposed on hangers or trunnions, the hood being entirely supported through the engagement of its side wall edges with the vehicle frame. However, as soon as the hood is tilted forwardly, trunnions 20 drop into bearing engagement with the hangers, and thus the hood is thrown into pivotal connection with the vehicle frame. Thus the connections between the frame and the forward end of the hood may be considered as having lost motion upon certain occasions.

In order that trunnions 20 may not be accidentally dislodged from hangers 19 and to eliminate the lost motion in the pivotal connection while the hood is being tilted the lower edge of front wall 15 is bent inwardly at 23 so it hooks beneath the hangers during such hood movement. (See dotted lines in Figure 4). However, the spacing of trunnions 20 from wall 15, and the extent of curved portion 23, is such that, when the hood is in lowered position, the trunnions may be raised out of bearing with the hangers and the hood may be lifted bodily from the vehicle frame without interference between hooks 23 and hangers 19. While the curved portions or hooks 23 are illustrated as being integral with front wall 15, I may substitute detachable hooks or projections therefor, without departing from the scope of my broader claims. The hood may be positively held in lowered position by any of the usual and well known clamping means, conventionally indicated at 24 (Figure 1), such means including separable and coacting clamping members disposed on the hood and vehicle frame.

In order to retain the hood in tilted position during periods of engine inspection or repair, I provide extension member 25. This member is made up of telescopically arranged rods 26 and 27 having pivotal connection at 28 and 29 with hood 10 and housing 12, respectively. It is apparent that when hood 10 is raised from the position of Figure 1 to that of Figure 2, the rods adjust themselves to their changed position by relative longitudinal movement. When the hood is at a predetermined angle with the vehicle frame, a notch 30 in rod 27 comes into register with slot 31 in rod 26 and the locking end 32 of spring detent 33 enters the notch to prevent further longitudinal movement between the rods. In this manner the hood is held from further pivotal movement in either direction until detent 33 is manually withdrawn from notch 30. Member 25 not only serves as a releasable means for holding the hood in tilted position, but also braces the hood against side sway when so tilted.

As a safe guard to prevent the hood from swinging too far in a counter-clockwise direction (as viewed in Figure 2) in the event of breakage or failure on the part of extension member 25, I extend a flexible strap 34 from hood to engine housing 12 as clearly illustrated in the drawings. A buckle 35 provides adjustment means for the strap and also allows said strap to be readily disconnected in the event it is desired to remove the hood bodily from the frame.

While I have illustrated and described a preferred embodiment of my invention, I do not wish to be limited thereto except for such limitations as a fair interpretation of the appended claims may import.

I claim:—

1. A mounting for tiltable vehicle hoods, including hangers supported at the forward end of the vehicle frame, brackets on the forward wall of the hood and including spaced arms extending to opposite sides of the hangers and thereby laterally positioning the forward end of the hood with respect to the vehicle frame, and trunnions carried by the brackets and adapted to pivotally engage the hangers when the hood is tilted.

2. In a mounting for tiltable hoods for vehicles, a horizontal pivotal connection between one end of the hood and the vehicle frame, said connection embodying two parts associated for limited relative pivotal movement about a horizontal axis, one of the parts being on the hood and the other part being on the frame, said parts being vertically, bodily separable when the hood is pivotally moved to a given selected position with relation to the frame, and a member on the hood adapted to engage the under side of said frame carried part and thereby hold said parts against vertical separation when said hood is pivotally moved to another selected position.

3. In a mounting for tiltable hoods for vehicles, hook shaped hangers supported at the forward end of the vehicle frame and with their mouths opening upwardly, trunnions carried by the hood and adapted to coact with the hangers for supporting the hood pivotally with respect to the frame when the hood is tilted, and means on the hood adapted to engage the underside of the hangers when the hood is in selected position with relation to the frame and thereby prevent upward movement of the trunnions through the hanger mouths when the hood is in said selected position.

In witness that I claim the foregoing I have hereunto subscribed my name this 17th day of November, 1923.

OSCAR FREDERICK LUNDELIUS.